(12) United States Patent
Maeso et al.

(10) Patent No.: US 11,526,977 B2
(45) Date of Patent: Dec. 13, 2022

(54) METHODS FOR TRANSMITTING DATA ACQUIRED DOWNHOLE BY A DOWNHOLE TOOL

(71) Applicant: Schlumberger Technology Corporation, Sugar Land, TX (US)

(72) Inventors: Carlos Maeso, Doha (QA); Daniel Quesada, Rueil Malmaison (FR); Ana Escobar, Bagneux (FR); Youssef Tamaazousti, Clamart (FR); Josselin Kherroubi, Clamart (FR); Jean-Christophe Auchere, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 268 days.

(21) Appl. No.: 16/868,739

(22) Filed: May 7, 2020

(65) Prior Publication Data

US 2021/0192712 A1 Jun. 24, 2021

Related U.S. Application Data

(60) Provisional application No. 62/949,580, filed on Dec. 18, 2019.

(51) Int. Cl.
*E21B 47/002* (2012.01)
*G06T 7/00* (2017.01)
(Continued)

(52) U.S. Cl.
CPC ........ *G06T 7/0004* (2013.01); *E21B 47/0025* (2020.05); *E21B 47/18* (2013.01);
(Continued)

(58) Field of Classification Search
CPC ...... E21B 47/0025; E21B 47/18; E21B 49/00; E21B 2200/20; E21B 47/002;
(Continued)

(56) References Cited

U.S. PATENT DOCUMENTS

| | | | |
|---|---|---|---|
| 2008/0186805 A1* | 8/2008 | Han | E21B 47/01 367/35 |
| 2011/0221883 A1 | 9/2011 | Johnston | |

(Continued)

FOREIGN PATENT DOCUMENTS

| | | |
|---|---|---|
| WO | 9852033 A1 | 11/1998 |
| WO | 2018117890 A1 | 6/2018 |

*Primary Examiner* — Phi Hoang
(74) *Attorney, Agent, or Firm* — Jeffrey D. Frantz

(57) ABSTRACT

The disclosure relates to a method and system for downhole processing of data, such as images, including using a set of downhole sensors to measure parameters relative to the borehole at a plurality of depths and azimuths and detecting predetermined features of the borehole, using a downhole processor, with a trained machine-learning model and extracting characterization data, characterizing the shape and position of the predetermined features that are transmitted to the surface. It also provides a method and system for providing an image of a geological formation at the surface including transmitting a first dataset to the surface that will be used for reconstructing an image at the surface, downhole processing of a second dataset to detect predetermined features and extract characterization data that are transmitted at the surface and displaying a combined image comprising the predetermined features overlaid on the first image.

11 Claims, 6 Drawing Sheets

(51) Int. Cl.
    *G06T 7/73*     (2017.01)
    *E21B 47/18*     (2012.01)
    *E21B 49/00*     (2006.01)
    *G01V 1/44*     (2006.01)
    *G01V 3/20*     (2006.01)
    *G01V 11/00*     (2006.01)
    *G06K 9/62*     (2022.01)
    *G06T 11/60*     (2006.01)

(52) U.S. Cl.
    CPC ............... *E21B 49/00* (2013.01); *G01V 1/44* (2013.01); *G01V 3/20* (2013.01); *G01V 11/002* (2013.01); *G06K 9/628* (2013.01); *G06K 9/6262* (2013.01); *G06T 7/73* (2017.01); *G06T 11/60* (2013.01); *E21B 2200/20* (2020.05); *G06T 2207/10132* (2013.01); *G06T 2207/20081* (2013.01); *G06T 2207/30181* (2013.01)

(58) Field of Classification Search
    CPC ........... E21B 47/00; E21B 47/12; G01V 1/44; G01V 3/20; G01V 11/002; G01V 1/305; G01V 1/50; G01V 3/30; G01V 11/00; G06T 7/0004; G06T 11/60; G06T 7/73; G06T 2207/10132; G06T 2207/20081; G06T 2207/30181; G06K 9/6262; G06K 9/628; G06N 5/003; G06N 20/00; G06N 3/0454; G06F 17/00
See application file for complete search history.

(56) References Cited

U.S. PATENT DOCUMENTS

| | | | |
|---|---|---|---|
| 2013/0169279 A1* | 7/2013 | Morys | G01V 11/007 324/338 |
| 2019/0003920 A1* | 1/2019 | Khalaj Amineh | E21B 47/09 |
| 2020/0018870 A1* | 1/2020 | Howell | G01V 1/301 |
| 2020/0190958 A1* | 6/2020 | Wessling | E21B 44/04 |
| 2020/0264330 A1* | 8/2020 | Etgen | G01V 1/008 |
| 2021/0115781 A1* | 4/2021 | Stark | H04N 13/243 |
| 2021/0149066 A1* | 5/2021 | Wu | G01V 1/005 |
| 2022/0003058 A1* | 1/2022 | Abdulrazzaq | E21B 33/138 |

* cited by examiner

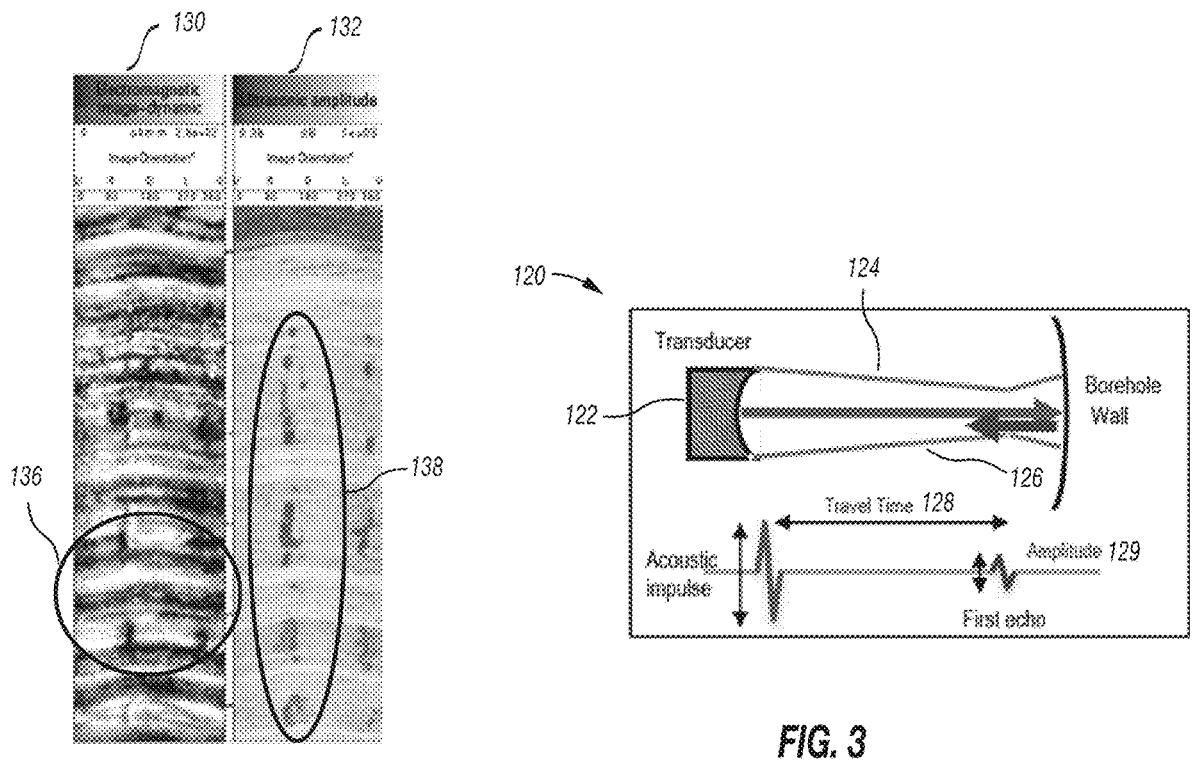
FIG. 4
FIG. 3
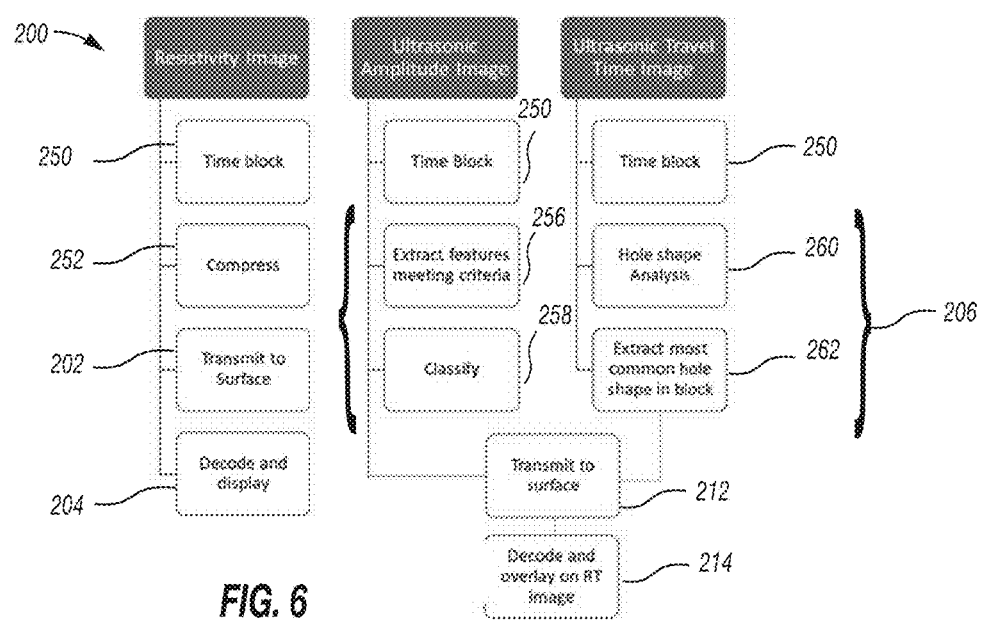
FIG. 6

METHODS FOR TRANSMITTING DATA ACQUIRED DOWNHOLE BY A DOWNHOLE TOOL

BACKGROUND

The disclosure relates to a system and method for providing an image of a geological formation and/or for processing data relative to the formation acquired downhole.

A plurality of downhole measurements for measuring the properties of a geological formation, such as resistivity, acoustic properties, density, etc. may be taken in the borehole in order to obtain information relative to the formation properties. The downhole measurements may be taken at a plurality of locations and processed in order to be presented as an image of the borehole showing the property as a function of depth and azimuth. In other words, high-resolution measurements are taken along depth and azimuthal position in the wellbore, thus generating 2-dimensional arrays referred to as "borehole images".

Borehole images of a geological formation contain rock structural features relative to the formations and also can respond to irregularities in the borehole shape. The rock structural feature are defined in the following as any spatial arrangement of rock whether naturally occurring or due to borehole damage or rugosity during the drilling activity. Rock structural features may include features intrinsic to the geological formation such as layer boundaries (or bedding), porosity, natural fractures, texture of the rock including vugs, irregular boundaries, such as stylolites. Rock structural features may also include geomechanical features including stress features such as breakouts or induced fractures or features related to drilling, including hole shape changes due to the drilling process.

Borehole images that measure different properties can provide complementary information regarding such rock structural features. For example, resistivity images are generally sensitive to intrinsic rock structural features (such as layer boundaries) whereas ultrasonic images respond strongly to variations in the borehole surface due to mechanical or drilling processes (such as hole shape, fractures, breakouts etc). Similarly, density images respond to lithology and porosity whereas resistivity images are sensitive to water content and connectivity.

The interpretation of these images is used extensively to characterize the formation and take decisions about the next steps of the operations. A full set of data is recorded in the downhole tools memory but this is only accessible when the tools are back on surface. When the images are required during drilling, transmission of the image information to the surface may allow decisions to be made during the operations phase.

However, and in particular when the measurements are acquired while drilling, in most cases, low telemetry rates are available from downhole to surface. For instance, mud pulse telemetry generally used when data are acquired during drilling, or a slickline cable allowing limited communication, do not enable a high rate of data transmission to the surface.

The bit rate (or amount of data transmitted per unit of time) has an upper limit, which is imposed by the telemetry system used for the acquisition. Typical maximum bit rate values for mud pulse telemetry systems may be 6 to 8 bits per second (bps) for a whole bottom-hole assembly (BHA). This generally comprises real-time measurements from multiple drilling and logging tools (possibly with multiple measurements per tool) each of which has to share a fraction of the total transmission bit rate with the other tools of the tool string.

Data transmission of an image requires a high proportion of the available telemetry bandwidth (even with data compression) of such telemetry systems, and the result is that, in practice, a single compressed borehole image is almost always the maximum information that can be sent from downhole to surface when telemetry rate is limited—such as in a drilling context. Where more than one borehole image is acquired during the drilling phase, a choice has to be made as to which image to transmit and all of the information obtained from the measurements cannot be transmitted at the surface in real-time. This limitation impacts the decision making as different images contain different types of information about the formations and borehole condition.

SUMMARY

This summary is provided to introduce a selection of concepts that are further described below in the detailed description. This summary is not intended to identify indispensable features of the claimed subject matter, nor is it intended for use as an aid in limiting the scope of the claimed subject matter.

The disclosure relates to a method and system for downhole processing of data, such as images, and a method and system for providing an image of a geological formation at the surface including downhole processing. Such methods may be used to provide key information relative to the rock structural features of the formation at the surface in real-time or near real-time. Based on such information the operations may be optimized.

In an embodiment, the disclosure relates to a method for providing an image based on data acquired downhole, relative to a borehole crossing a geological formation, by a downhole tool comprising at least a first and second imaging sensor sets. The method includes transmitting a first dataset acquired by the first imaging sensor set at the surface and reconstructing a first image of the borehole using the first dataset. The method also includes processing downhole a second dataset acquired by the second imaging sensor set. The downhole processing includes detecting predetermined rock structural features of the borehole and extracting characterization data characterizing the shape and position of the predetermined features. The characterization data may then be transmitted at the surface and, based on characterization data, the predetermined rock structural features are overlaid on the first image to form a combined image.

In another embodiment, the disclosure relates to a method for processing measurements acquired downhole in a borehole crossing a geological formation. The method includes using a set of downhole sensors to measure one or more parameters of the borehole at a plurality of depths and azimuths. The method also includes detecting predetermined features of the borehole, using a downhole processor. Detecting the predetermined feature includes inputting a dataset representative of the one or more parameters into at least a trained machine learning model. The machine learning model has been trained based on a training dataset representative of previously identified predetermined features. The method then includes extracting data characterizing the shape and position of the predetermined features based on an output of the trained machine learning model. The data characterizing the shape and position of the predetermined feature are then transmitted at surface.

In another embodiment, the disclosure relates to a system for providing an image based on data relative to a borehole crossing a geological formation. The system comprises a downhole tool comprising at least a first and second imaging sensor sets for acquiring respectively a first and second dataset and a control system including a telemetry system for transmitting data from the downhole tool to the surface, a downhole processing unit, situated downhole or configured to be lowered in the borehole with the downhole tool, and a surface processing unit situated at the surface. The downhole processing unit is configured to process downhole the second dataset, which includes detecting rock structural features of the borehole and extracting characterization data characterizing the shape and position of the features. The telemetry system is configured for transmitting the first dataset and characterization data at the surface, and the surface processing unit is configured to reconstruct a first image of the borehole using the first dataset and, based on characterization data, displaying the predetermined rock structural features overlaid on the first image to form a combined image.

The disclosure also relates to a system for processing measurements acquired downhole in a borehole crossing a geological formation. The system includes a downhole tool comprising at least a sensor set for measuring one or more parameters relative to the borehole at a plurality of depths and azimuths. It also comprises a downhole processing unit, situated downhole or configured to be lowered in the borehole with the downhole tool, that detects of the borehole using a trained machine learning model. In particular, the downhole processing unit inputs datasets representative of the parameter into the trained machine learning model. The machine learning model has been trained based on a training dataset representative of previously identified predetermined features. The downhole processing unit also extracts data characterizing the shape and position of the predetermined features based one an output of the machine learning model. The system also includes a telemetry system configured for transmitting the characterization data at surface.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion FIG. 3 is a schematic drawing of an ultrasonic transducer and signal, FIG. 4 is a plot of classical images provided by downhole tools, FIG. 6 is a flowchart of a method for providing an image according to an embodiment of the disclosure.

DETAILED DESCRIPTION

One or more specific embodiments of the present disclosure will be described below. These described embodiments are examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
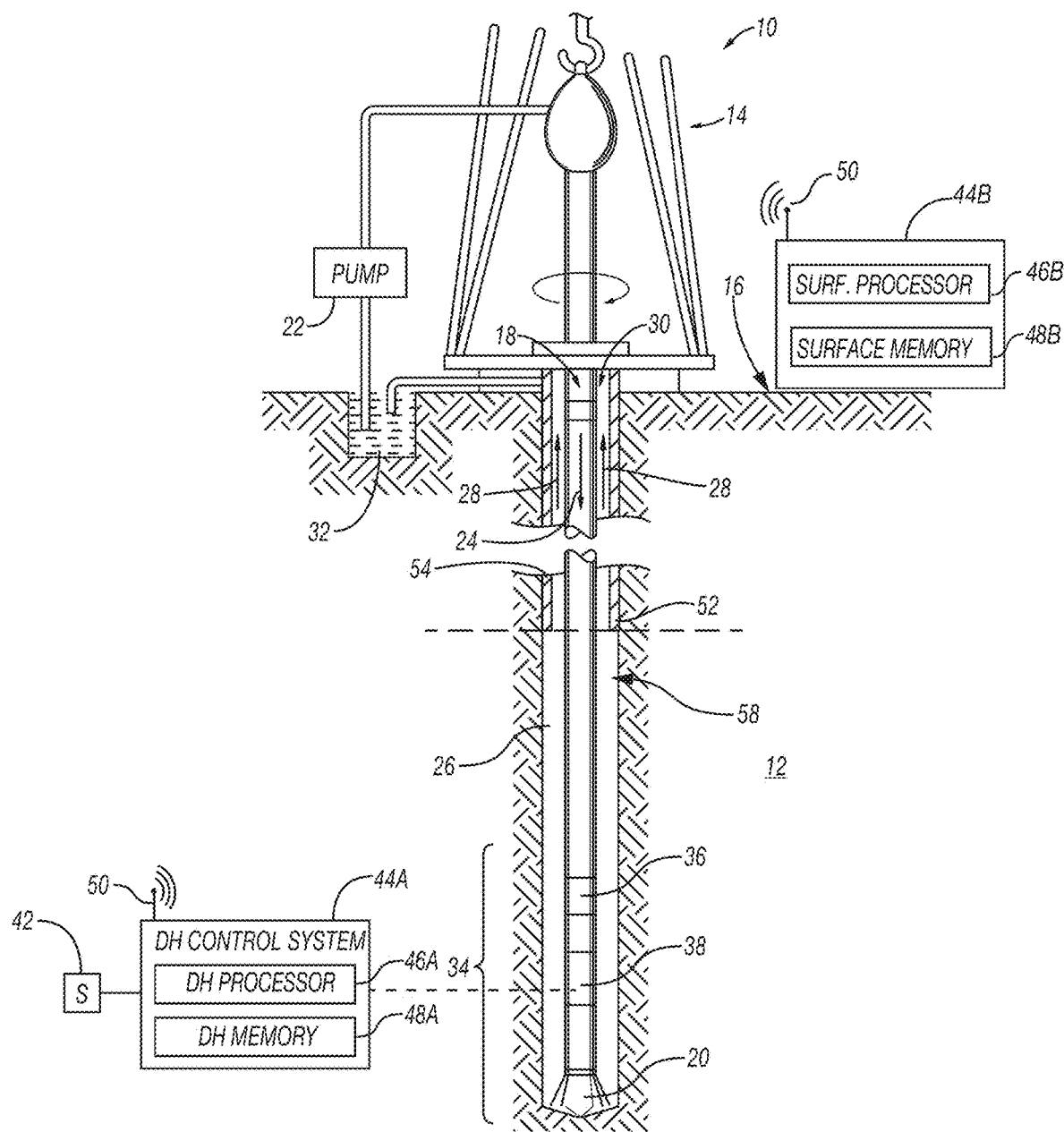
FIG. 1 is a schematic diagram of a drilling system including one or more systems according to an embodiment of the disclosure.

FIG. 1 is a schematic diagram of a drilling system 10, which may be used to drill a well or borehole through a geological formation 12. In the depicted example, a drilling rig 14 at the surface 16 rotates a drill string 18 (or toolstring), which includes a drill bit 20 at its lower end to engage the sub-surface formation 12. To cool and/or lubricate the drill bit 20, a drilling fluid pump 22 may pump drilling fluid, referred to as "mud" or "drilling mud," downward through the center of the drill string 18 in the direction of the arrow 24 to the drill bit 20. At the drill bit 20, the drilling fluid may then exit the drill string 18 through ports. The drilling fluid may then flow in the direction of the arrows 28 through an annulus 30 between the drill string 18 and the geological formation 12 toward the surface 16. In this manner, the drilling fluid may carry drill cuttings away from the bottom of a borehole 26. Drill cuttings or "cuttings" include small pieces of rock or other debris that break away from the geological formation 12 as a result of drilling. Once at the surface 16, the returned drilling fluid may be filtered and conveyed back to a mud pit 32 for reuse.

Additionally, as depicted, the lower end of the drill string 18 includes a bottom-hole assembly 34 that includes the drill bit 20 along with a downhole tool 36, such as a measuring tool, a logging tool, or any combination thereof. Generally, the downhole tool 36 may facilitate determining characteristics of the surrounding formation 12. Thus, in some embodiments, downhole tool 36 may include one or more sensors 42. In the embodiment, the one or more sensors 42 may comprise a first and optionally, a second sensor set. Further references to the sensor 42 may refer to one or more sensors 42 of the downhole tool 36. In some embodiments, the sensor 42 may include an electrical sensor (for instance, an electromagnetic transducer or receiver), which may perform electrical measurements (such as galvanic or inductive electrical measurement) returned from the surrounding formation 12 and/or an acoustic sensor (such as an acoustic pulse-echo transceiver) emitting an acoustic excitation signal towards the formation and receiving an echo. Both enable to obtain properties relative to the borehole, including relative to the formation crossed by the borehole. The sensor may be any other appropriate sensor such as a nuclear sensor and/or density sensor. The downhole tool may include as well a position module enabling to give information relative to the tool position such as magnetometer, accelerometer, gyroscope, etc.

As shown on FIG. 1, the borehole may be cased in its top portion 52, i.e. a casing 54 has been added to surround the borehole and is attached to formation with cement (not shown) situated between the casing and the formation. The casing insulates the borehole from the formation and consolidates the borehole. In this portion of the borehole, the drilling fluid does not contact the formation. The casing is generally a metallic tubing. On the contrary, in its bottom portion 58, the borehole is open hole, i.e. the drilling fluid circulating in the borehole directly contacts the formation. The measurements enabling to characterize the formation are generally taken in the open hole portion 58 of the borehole.

In some embodiments, a control system 44 may control operation of the downhole tool 36. For example, the control system 44 may instruct the downhole tool 36 to perform measurements using the sensor 42 and/or process the measurements to determine characteristics of the surrounding environment (e.g., formation 12). A portion of the control system 44A is included in the downhole tool 36 or in another downhole tool 38 and another portion 44B may be located at the surface.

Information (e.g., measurements and/or determined characteristics) may be transmitted within the control system 44 for further processing, for example, via a telemetry system 50 such as a mud pulse telemetry system (not shown) and/or a wireless communication system To facilitate controlling operation, the control system 44 may include one or more processors 46 and one or more memory devices 48 including a downhole processing unit (or downhole processor) 46A—situated downhole, in the toolstring, ie in the downhole tool 36 or in an other downhole tool—and a surface processing unit (or surface processor) 46B. Further references to "the processor 46" are intended to include the one or more processors 46. In some embodiments, the processor 46 may include one or more microprocessors, one or more application specific processors (ASICs), one or more field programmable logic arrays (FPGAs), or any combination thereof. Additionally, the memory 48 may be a tangible, non-transitory, machine-readable medium that stores instructions executable by and data to be processed by the processor 46. Thus, in some embodiments, the memory 48 may include random access memory (RAM), read only memory (ROM), rewritable flash memory, hard drives, optical discs, and the like. In the embodiment, a memory, ie downhole memory 48A, is associated to the downhole processor 46A and an other memory, ie surface memory 48B, is associated to the surface processor 46A.

In the embodiment of FIG. 1, the a drilling system has been disclosed, however the downhole tool might also be part of a toolstring lowered via a cable such as wireline or slickline, a coiled tubing or any other conveyance mean in the borehole and communicating with a control system situated at the surface by any communication or telemetry system.

Figure 2:
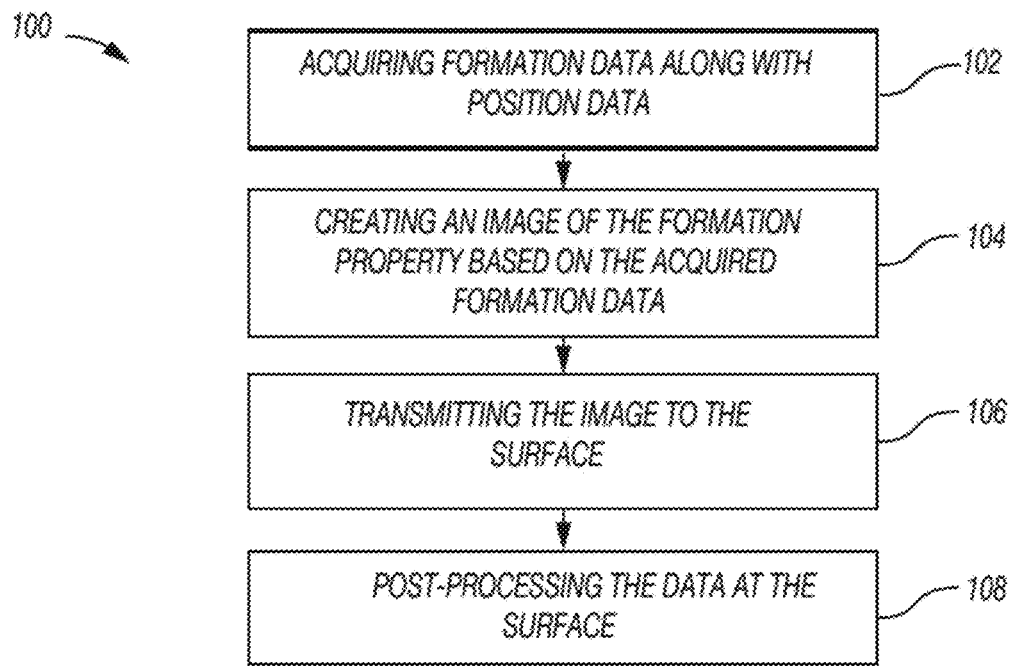
FIG. 2 is a flowchart of a method for providing downhole data according to the prior art.

FIG. 2 is an operating workflow 100 of a downhole tool according to the prior art.

In a first operation, the downhole tool acquires data relative to a property of the borehole (in particular relative to formation) with the sensor 42, such as data relative to the resistivity of the formation and/or an ultrasonic parameter in relationship with the formation or hole shape, along with position data (block 102).

Then, the control system, in particular the downhole portion of the control system, processes the acquired formation and position data and processes the data in order to create an image of the property in the formation (block 104). The image may be in particular a turn-indexed image (i.e. time data correctly rearranged azimuthally with respect to a chosen reference, e.g. North for wells deviated less than 30°, of Top-of-the-hole for wells deviated more than 30°). The number of turns in each block of a turn-indexed image is defined by the rate of rotation (RPM) of the tool. This can vary even within one block, so the number of samples acquired by the tool differs from block to block. An image of a borehole, whether turn-indexed or depth-indexed, comprises pixels, and the value of each pixel corresponds to the value of a measured parameter at the position of the pixel.

Then, the processed image is transmitted to the control system situated at the surface, via the available telemetry. The image may be compressed by any appropriate method in order to decrease the available bandwidth needed for the transmission (block 106).

At the surface, the image is then post-processed, i.e. more complex processing enabling to identify rock structural features is applied. Such post-processing necessitates more computing power and may include converting the image to depth-indexed image, dip picking, hole shape analysis, etc. (block 108).

When several images are computed downhole, all images may be transmitted and post-processed independently. Some post-processing algorithms may allow identifying rock structural features based on a combination of images.

All or part of the images may be stored on the downhole control system and retrieved when the tool is pulled out of hole and available at the surface and therefore all of the data acquired are not available in real-time or near real-time.

An example of a downhole tool providing several images of the borehole is the TerraSphere™ downhole tool operated by Schlumberger®. This downhole tool includes a first imaging sensor set, including an electromagnetic sensor emitting an electromagnetic signal towards the formation and measuring characteristics of a returning signal to derive resistivity of the formation at different locations of the borehole wall.

This downhole tool also includes a second imaging sensor set, including an ultrasonic sensor 120, shown on FIG. 3, comprising at least a transducer 122 emitting an ultrasonic signal 124 towards the borehole wall where the signal is reflected and receiving the reflected signal (also called "echo") 126. Several characteristics of the reflected signal may be measured, such as the travel time 128 and the amplitude 129.

FIG. 4 shows two images obtained from the downhole tool as presented above. An image 130 of the resistivity of the formation in the vicinity of the borehole wall as well as an image 132 of the amplitude of the ultrasonic echo are in particular obtained from the tool. The rock structural features of the borehole wall are visible on the images, in particular layering 136 that is more visible on the resistivity image, or breakouts 138, that are more visible and better defined in the ultrasonic amplitude image.

The FIGS. 3 and 4 describe an embodiment of a downhole tool and of the resulting images but some of the methods disclosed below could be applicable to other tools and images, such as taken with different sensors or relative to other parameters taken with such sensors.

Figure 5:
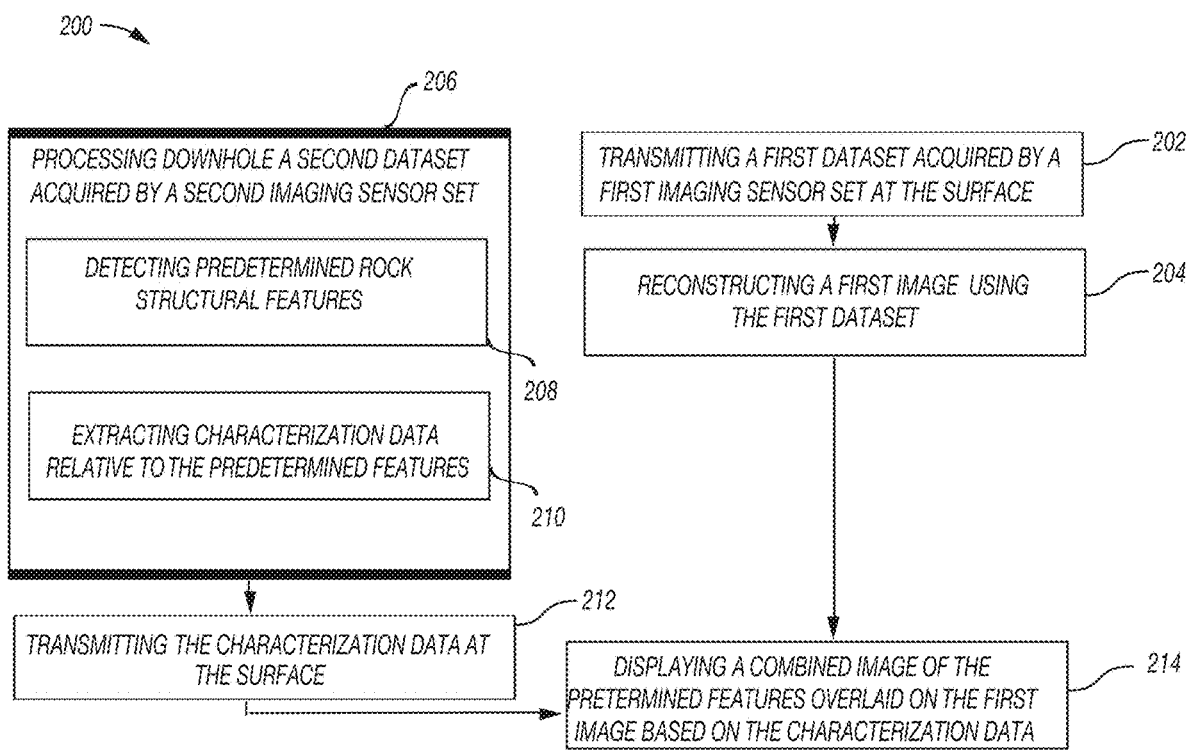
FIG. 5 is a flowchart of a method for providing an image according to an embodiment of the disclosure.

FIGS. 5 & 6 disclose a method 200 according to an embodiment of the disclosure. FIG. 6 is a method relating to a specific example of a dual (electromagnetic and ultrasonic in this embodiment) imager. Indeed, as already explained above, the two measurements are complementary. The electromagnetic (EM) images are used to derive an apparent resistivity of the rock around the wellbore, which is important for the geological interpretation of the reservoir. Visualizing them in real-time has an obvious interest for making active decisions, for instance during the drilling phase, in terms of well placement, geosteering and geological interpretation: they are used to check that the well remains in the targeted layers of the reservoir and does not deviate from the planned trajectory. The ultrasonic (US) images are more receptive to the surface of the wellbore and are therefore better suited to geomechanical interpretation of the reservoir. Borehole damage stemming from the stress variation around the borehole are clearly visible on these images. Their localization provides insight on the state of stress in the reservoir, and on how drillers should adjust the mud weight in order to ensure the well stability (and thus minimize the risk of well collapse or mud losses while drilling).

The method according to the disclosure includes transmitting a first dataset acquired by a first imaging sensor set (comprising one or more sensors) to the surface (block 202). The first imaging sensor may be for instance a resistivity or electromagnetic sensor and the dataset may be representative to one or more parameters measured by the first imaging sensor, such as a resistivity of the formation, and of position data. As indicated on FIG. 6 specific to the downhole tool described in accordance with FIGS. 3 and 4, before transmitting the first dataset to the surface, the downhole tool may form time blocks (block 250) gathering the measurements taken during a time period of a predetermined duration, e.g. 150 seconds, and compress (block 252) the time blocks. The time blocks that are processed may be based on turn-indexed images as explained above, in particular a portion of a turn-indexed image. The method may also comprise, processing measurements to create a turn-indexed image, which is a conventional processing. Switching from time to turn indexes requires binning these measurements into azimuthal sectors that are fixed from one turn to the other. These sectors define the columns of the turn-indexed image.

Splitting the image into blocks is advantageous as each block can be individually compressed and streamed in real-time for visualization at the surface while the tool keeps acquiring new measurements downhole. This approach shortens the time to interpretation and scales as well conveniently to the hardware requirements (every portion of the image already processed can be cleared from the tool real-time memory). However, a time block may comprise all of the data acquired during the downhole run if the downhole computing power is sufficient. Further, the embodiment of FIG. 6 is a particular embodiment but, when downhole computing power is available, more processing (including conversion of the image to a depth-indexed image) might be performed downhole before the first dataset is sent to surface.

The method also includes reconstructing a first image of the borehole wall using the first dataset (block 204), that may include decoding or decompressing the image and displaying the image as indicated on FIG. 6. This operation is performed at the surface. Some processing may also be applied at the surface before displaying the image (including the conversion of the image to a depth-indexed image).

The method may also comprise processing downhole a second dataset acquired by a second imaging sensor set (block 206). The second imaging sensor set may be an ultrasonic sensor. The downhole processing includes detecting predetermined rock structural features (block 208) of the borehole, such as fractures and breakouts, and extracting characterization data characterizing the shape and position of the predetermined features (block 210). The detection of predetermined rock structural features may be performed using deterministic algorithms such as algorithms currently used at the surface, at the post-processing stage. It may also include using a machine learning model that has been trained as will be explained in more details below. The latter approach may comprise classifying each pixel of the image into categories corresponding to the predetermined rock structural feature types (and a category showing no rock structural feature).

The characterization data may include the data relative to a position of a center point of a rock structural feature, dimensions of the rock structural features along one or more predetermined axis, and/or orientation of the main axis, and/or position of a perimeter of a rock structural feature and/or of all of the points belonging to the rock structural features. For instance, the characterization data for a fracture may include position of a center point, an orientation and a length. For a breakout, the characterization data may comprise a center point, and a dimension along two perpendicular axes, or the position of the breakout contour. In an embodiment, a breakout may be considered as a parallelogram described by 4 parameters constituting the characterization data, including for instance the horizontal position of top left and bottom left corner, height and horizontal width. For a dip or layer boundary, the characterization data may include coordinate of a predetermined sinusoid feature, and amplitude of the sinusoid.

In an embodiment, the characterization data is determined as a function of the available telemetry. For instance, in case of a breakout, the characterization data may include only an information regarding the presence of a breakout in a portion of the image (such as a time block) if only 1 bit available. If 2 bits available, the characterization data may include the number of breakouts in the portion. If more bits are available, the center point and a dimension along one or two axis of each breakout is available. If optimum telemetry is available, the coordinates of the contour of the breakout may be transmitted.

An example of characterization data transmitted at the surface may include but is not limited to:
  On 1 bit, presence or absence of the feature (for instance, if induced fractures and breakouts are sought to be detected, 1 bit for induced fractures and 1 bit for breakouts),
  On 4 bits, position of the center point of at least one of the feature (based on a 16-sectors division of the image); i.e. the 4-bit sequence showing in which sector the center point is located. Of course, the time block may be divided in more or less than 16 sectors for instance depending on the available bandwidth, in which case the number of bits necessary for locating the center point be higher, On 2 bits, for a breakout, the number of sectors covered by the breakout (1 to 4). Similarly, when additional bandwidth is available, the number of sectors covered may be lower or higher (ie, 1 to 8 for 3 bits)

On 2 bits for a fracture, the range of inclination compared to a predetermined axis (for instance between 0-45°, 45-90°, 90-135° and 135-180°). Similarly, when additional bandwidth is available, the number/size of ranges may be different.

When the rock structural features are classified according to their type (i.e. fracture, bedding, breakout, etc.), only the characterization data regarding one or several types of rock structural feature may be transmitted to the surface based on the instructions provided from the surface, by the control module or by the user and/or on the available telemetry bandwidth. For instance, taking into account the above example, if the number of bits is a constant number, and the image contains breakouts and induced fractures, the information characterizing the breakout may be prioritized over the information characterizing the induced fracture based on the needs determined at the surface.

The method comprises then transmitting to the surface the characterization data (block 212), and, based on characterization data, displaying a combined image comprising the predetermined features overlaid on the first image (block 214), i.e. highlighting the zone identified by the characterization data on the first image (i.e. contour, or circle/ellipse/parallelogram obtained thanks to the characterization data), or when the characterization data are very basic, the portion of the image corresponding to the time block in which the feature appears. In an embodiment, first characterization data are obtained based on the detection by downhole processing (for instance identifying the location of the contour of the breakout) and second characterization are transmitted at the surface (such as a more simplistic representation of the contour). The second characterization data may be derived from the first characterization data, as a function of one or more parameters, such as the available bandwidth. In other words, the second characterization data is selected from a plurality of possible second characterization data types based on the available bandwidth.

When the first image is displayed as a depth-indexed image, some additional processing may be performed to convert the turn-indexed characterization data into corresponding depth-indexed characterization data before displaying the image.

In the embodiment of FIG. 6, two images are processed downhole (ultrasonic amplitude and travel time), by the control system. As already described for the resistivity image, time blocks are formed for each of the ultrasonic images (block 250). Then, each of the time blocks is processed downhole, in order to extract characterization data relative to the rock structural features. In the embodiment of FIG. 6, the characterization data of the fractures are derived from the ultrasonic amplitude image whereas the characterization data of the breakouts are obtained from the ultrasonic travel time image. The characterization data are then transmitted to surface as described above (block 212) and displayed, i.e. overlaid, on the first (resistivity) image (block 214)

In this embodiment, feature extraction techniques may be applied that meet predefined criteria (block 256) for the ultrasonic amplitude image. For example, linear features are extracted which fall into certain orientations (e.g. within 30 degrees of borehole parallel or exceed a certain number of pixels in length). The linear features are then classified along with characterization data (block 258). The characterization data (possibly a fraction of the characterization data based on the available telemetry) are transmitted to surface. An example would be an image in which bedding and induced fractures are present. Both being linear features, they are recognized by the feature extraction technique and classified based on their characterization data in two different types of features. Based on user's instructions or algorithm settings, a preferential filter selects the induced fracture for transmission as the feature of interest.

In this embodiment, for the travel time images, previous hole shape analysis algorithms may be used. These methods are currently used for depth-indexed data at the surface. In this case the analysis may be carried out on time-indexed or turn-indexed data. Within the block each time-scan (corresponding to a revolution of the tool) is analyzed in terms of shape (such as: is the borehole a cylinder, if not does it best fit a pattern for one-sided enlargement or two-sided enlargement). This corresponds to a borehole profile at a predetermined depth (block 260). Then the full time-block (corresponding to several depths) is analyzed for patterns (funnel shaped, ledged, breakout, keyseat, spiral etc) and the dominant pattern is assigned and characterization data obtained (block 262).

Of course, the method of FIG. 6 is only an exemplary embodiment, and the number and type of measurements used for the first image sent to the surface and for the second image(s) processed downhole may be different from what has been disclosed hereinabove. Similarly, the rock structural features that are characterized are not limited to the ones that are disclosed above but may also comprise one or more of dips, vugs, texture, stylolites, etc.

In another embodiment, the disclosure comprises a method for processing data downhole and extracting features of the borehole. In some embodiment, such method may use artificial intelligence and machine learning algorithms in order to process the information downhole.

Figure 7:
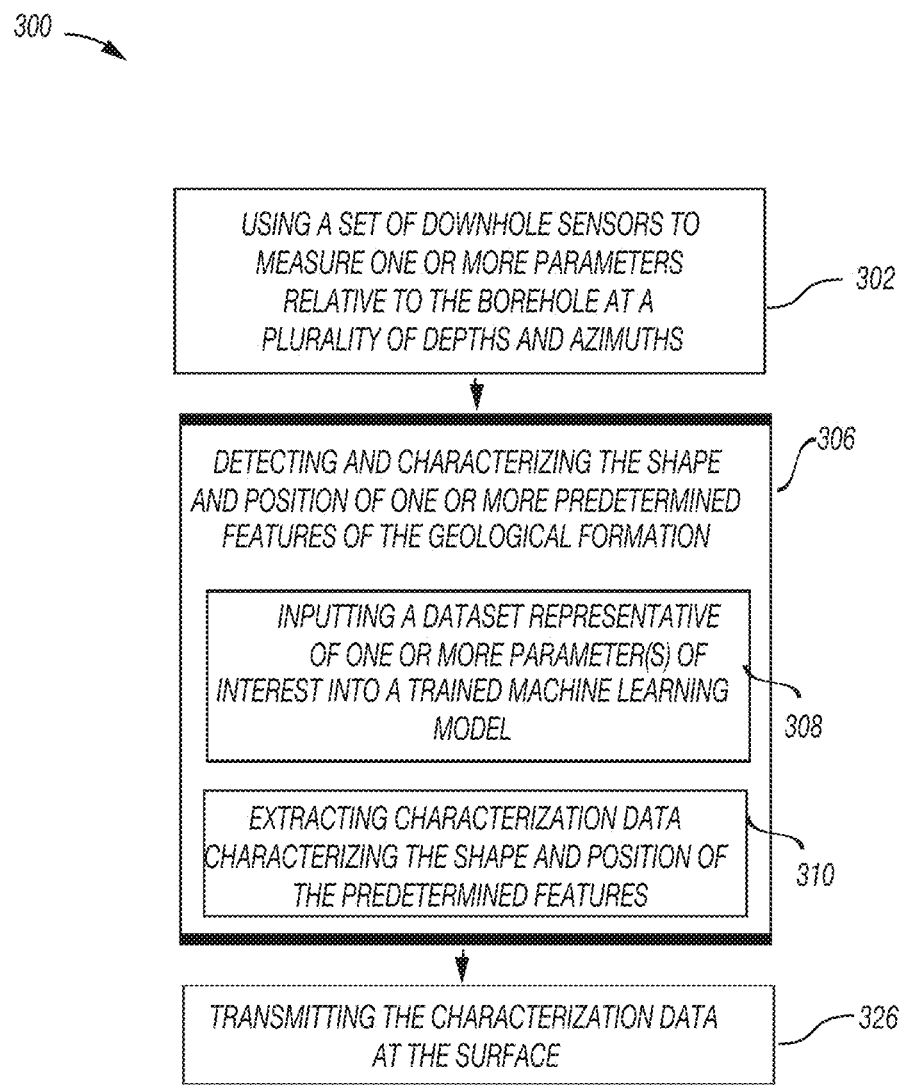
FIG. 7 is a flowchart of a method for processing downhole data according to an embodiment of the disclosure.

An embodiment of such a method is disclosed on FIG. 7. This method may of course be used in combination with method disclosed in relationship with FIG. 5. Once again, the method is described in relationship with an ultrasonic sensor, in particular with the amplitude image, but could be applicable to any other image obtained via the ultrasonic sensor and/or any other sensor.

The method 300 of FIG. 7 therefore comprises using a set of downhole sensors to measure one or more parameters relative to the borehole at a plurality of depths and azimuths (block 302). In the case of an ultrasonic sensor, this operation relates to firing a series of pulses at different depths and azimuths toward a borehole wall and receiving an echo signal reflected by the borehole wall.

The operation 302 may comprise analyzing the measured signal to derive at least a parameter of interest. In the case of an ultrasonic sensor, the parameter of interest is at least one of a travel time 128, i.e. time between the firing and the echo signal, and of an amplitude of the echo signal 129 as explained in relationship with FIG. 3. The one or more parameters of interest are part of an input dataset.

The method then comprises detecting and characterizing the shape and position of one or more predetermined rock structural features of the borehole (block 306), using a downhole processor. Detecting the predetermined rock structural features includes inputting one or more datasets representative of the parameter into a trained machine learning model (block 308) and extracting data characterizing the shape and position of the predetermined features shown in each of the dataset (block 310) based on an output of the trained machine learning model.

As indicated above, the input dataset may include one or more turn-indexed images or time blocks representing the one or more parameters of interest. However, in an embodiment, the turn-indexed images may be pre-processed to be transformed into the one or more input datasets. Such pre-processing may include any well-known pre-processing such as conversion to depth, normalization, equalization, filtering, etc. The pre-processed dataset, even when converted to depth is considered representative of the parameter of interest (and representative of the parameter measured over time as the measurement over time is the basis for the depth conversion). Such pre-processing may enable to obtain a more accurate detection but necessitates a higher downhole computing power. Such pre-processing is optional and the method enables a very satisfying detection without such pre-processing operations.

The machine learning model may have been trained based on training datasets representative of known predetermined rock structural features associated with corresponding input dataset (including time-indexed image in the current embodiment). In particular, the training datasets may comprise the input images (or time blocks) along with the pixels corresponding to the target rock structural features and annotation or label indicating which feature the pixel corresponds to. Of course the training may take place before the measurements are taken and processed anywhere, and in particular at surface where more computing power is generally available. The trained machine learning model corresponds to a model with parameters or coefficients minimizing the error made between the predictions of the machine learning model based on the input images and the labels assigned to each pixel over the training set.

The input dataset may comprise one parameter of interest (such as one image—or image block) or several parameters of interest (such as several images—or image blocks—corresponding to a same section of the borehole, or any relevant combination of parameter), which may enable to have a more robust output.

Figure 8:
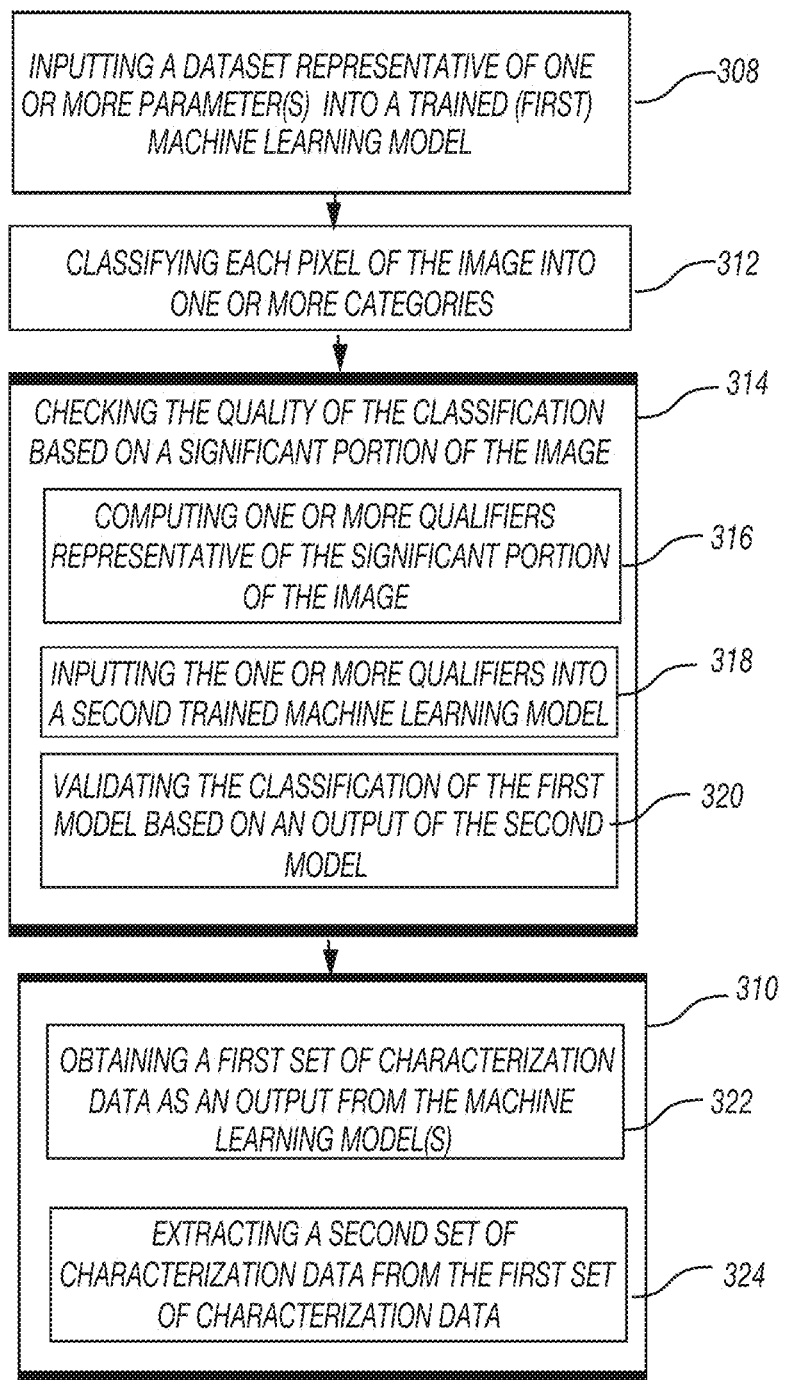
FIG. 8 is a flowchart of a portion of the method of FIG. 7 according to an embodiment of the disclosure.

As shown in relationship with FIG. 8 describing a particular embodiment of a detection operation (block 306) when the input dataset comprises one or more images (in 2 dimensions as per the example but the image may also be a one or three dimensions image), the method may include inputting the input datasets into the trained model (block 308). Each pixel of the image is then classified into a category, wherein at least a category corresponds to the one or more rock structural features (block 312). The categories may include a category per type of rock structural features and in some embodiment for each type of feature, subcategories of features may be identified (for instance, induced fractures or natural fractures and/or breakout caused by the drilling process or by stress change). Of course, there is at least one category corresponding to no rock structural feature of interest. In the example of the ultrasonic sensors, the categories that may be determined may include breakout and/or fractures, in particular induced fractures, as discussed above.

The machine learning model may be based on supervised or unsupervised learning. Further, it may include a machine learning algorithm where each pixel of the turn-indexed image is classified as being part of a rock structural feature based on predetermined statistical features. The statistical feature for classifying a pixel generally relate to the pixel itself and the neighbouring zone. In another embodiment, the machine learning model may include a pre-trained convolutional neural network (CNN) with a classification layer at the output classifying each pixel of the turn-indexed image into different categories and/or subcategories of rock structural features as explained above. In other words, the trained machine learning model predicts the category of each pixel of the turn-indexed image.

Using a CNN may enable to use less computing power and may be appropriate when the amount of available computing power is low as the CNN uses simple operations (e.g. additions and multiplications). Furthermore, a given architecture of CNN can be at least partially reused to extract another rock structural feature type in contrast with deterministic algorithms, in contrast, that may differ greatly depending on the feature type and need to be juxtaposed in the downhole tool. Besides, there is no distinction between the recognition phase (where the presence of the feature is acknowledged) and the classification phase as it would be for a deterministic algorithm, which makes the workflow considerably simpler.

In an embodiment the detecting operation may comprise a pixel by pixel classification as explained above with a first machine learning model in connection with block 312 as well as an optional quality check operation (block 314) checking the output of the pixel by pixel classification performed at block 312. The quality check operation is based on one or more qualifiers representative of a significant portion of the dataset, for instance on the entire time block. For the avoidance of doubt, a significant portion of the dataset may comprise at least a portion of 10*10 pixels of the image. Such quality check operation increases the accuracy of the detection. The greater the portion is, higher may be the accuracy of the quality check.

Figure 9:
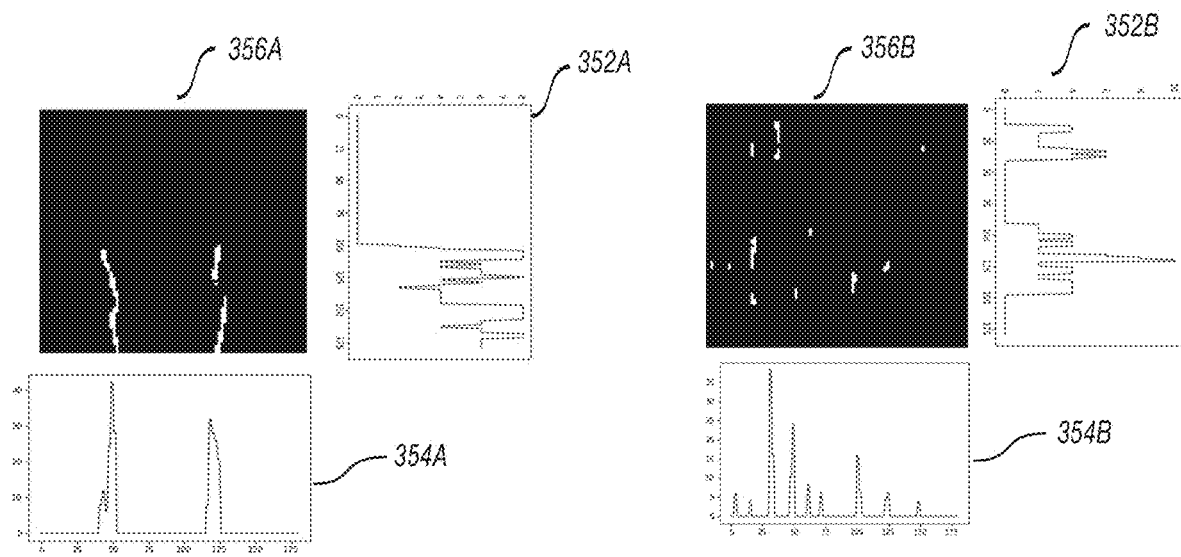
FIG. 9 shows details of a particular operation of the method of FIG. 8.

The quality check operation may comprise computing one or more qualifiers representative of a significant portion of the dataset (block 316). The qualifier for such quality check operation may include the numbers of detected pixels in each column and line of the time block. This operation will be better understood in relationship with FIG. 9 where the qualifier for each time block is shown as two plots 352A-B, 354A-B representing the distribution of pixels detected as a rock structural feature respectively in each line/column of the image. The qualifier may be inputted to a second machine learning model (such as a k-NN, decision tree, etc.) trained with positive (i.e. image including pixels detected as rock structural feature by the first machine learning model, indeed representing a rock structural feature) and false positive results (i.e. images including pixels detected as rock structural feature by the first machine learning model, and not representing a rock structural feature) of the first machine learning models as shown in block 318. The second machine learning model classifies the portion of the image as a positive or false positive and based on the output of the second machine learning model and the classification results of the first machine learning model are validated or not (block 320) based on the classification of the second machine learning model. In the results shown on FIG. 9, the first image 356A is a positive and the second image 356B is a false positive. It can be seen in this example that the qualifier is a signature that enables capture whether there is really a fracture on the image or if the rock structural features are detected by the first statistical measurement due to artifacts. Validating the results of the first model classification includes validating the category in which at least one pixel is classified (in particular when the second machine learning model showed a positive output) and/or changing the category in which at least one pixel is classified (in particular when the second machine learning model showed a false positive output).

The method may comprise other appropriate post-processing downhole in replacement or complement of the validity check that has been described above. For instance, a simple set of rules based on number of features in the image or dimensions of the features may be applied and/or other types of qualifier may be applied.

Coming back to the extraction operation at block 310 shown on FIG. 7, the classification results obtained from the (first or second) machine learning model (an image of the category associated to each pixel) is a first characterization data set characterizing the shape and position of the rock structural features and the extraction operation may comprise obtaining this first characterization data set from the machine learning model(s) (block 322).

In a particular embodiment, the extracting operation (block 310) may additionally comprise extracting a second characterization data set characterizing the shape and position of the rock structural features from the first characterization data set. The second dataset may comprise data as disclosed hereinabove, i.e. relative to the position of a center point of a rock structural feature, dimensions of the rock structural features along one or more predetermined axis, and/or dimension and orientation, and/or position of a perimeter of the rock structural features. The second data set is a more compact representation of the features that therefore necessitates less memory space and bandwidth when transmitted.

The method then includes transmitting the data (i.e. first and/or second dataset obtained as per block 310) characterizing the shape and position of the predetermined feature at surface (block 326). Transmission may be provided by any available techniques including mud pulse telemetry and/or wired drill pipes when the method is used during drilling, electric or fiber optic transmission when such cable are available, generally in the case of a wireline, slickline or coiled tubing job. When several types of features are detected, the transmitted characterization data may also include classification information indicating the type of the feature. As indicated above, only features from predetermined categories or subcategories may be transmitted to the surface. The transmission operation has been described in detail in relationship with FIGS. 5 & 6. The same embodiments and variants may apply to the method described here.

In a particular embodiment, when characterization data is sent at the surface, an alarm (visual, audible or any other alarm) may be triggered to indicate the predetermined features has been detected. In an embodiment, before the alarm is triggered, some post-processing and/or validity check (such as the ones described hereinabove) may also be triggered upon reception of the data at the surface. The characterization data may be displayed for visualization by an operator, for instance on another image, as disclosed in relationship with FIGS. 5 & 6.

In a specific embodiment of the disclosure, when using a CNN, the method may comprise defining before or during the job the rock structural features that need to be transmitted at the surface. When only a subset of the rock structural features is selected and need to be transmitted at the surface, the method may comprise pruning the initial CNN to obtain a specific CNN of reduced size targeted to the subset of the rock structural features. Such pruning operation may be obtained by any appropriate pruning algorithm before or during the job and may increase the efficiency and speed of the neural network to obtain timely responses. Such pruning operation may be performed for instance during the job when adding drilling pipes in order to maximize the downhole computing power that may be used for this operation while enabling to have agile operation delivering a variable result of interest depending on the wellbore configuration while the job is ongoing.

The methods that have been described therein enable to provide a more accurate representation of the borehole, detecting, transmitting information about and displaying rock structural features and of interest in real-time. Such representation may be used at the surface to take decisions on the drilling of the borehole, in particular regarding drilling direction, mud injection, etc.

The disclosure relates in particular to a method for providing an image based on data acquired downhole, relative to a borehole crossing a geological formation, by a downhole tool comprising at least a first and second imaging sensor sets. The method includes transmitting a first dataset acquired by the first imaging sensor set at the surface and reconstructing a first image of the borehole using the first dataset. The method also includes processing downhole a second dataset acquired by the second imaging sensor set. The downhole processing includes detecting predetermined rock structural features of the borehole and extracting characterization data characterizing the shape and position of the predetermined features. The characterization data may then be transmitted at the surface and, based on characterization data, the predetermined rock structural features are overlaid on the first image to form a combined image that is displayed.

In an embodiment, the first imaging sensor set is a resistivity sensor set and the second imaging sensor set is an ultrasonic sensor set. However, the invention is not limited to such sets of sensors and other sets of sensors might be considered (such as density, nuclear, etc.). In an embodiment, each imaging sensor measures a parameter of interest of the borehole at a plurality of depths and azimuths.

Each dataset, ie first and second dataset, comprises data relative to one or more measured parameter as well as data relative to a position. At least one of the datasets may for instance comprises a turn-indexed image. In an embodiment, in particular when the second sensor set is an ultrasonic sensor, the measured parameter may comprise at least one of a travel time and an amplitude.

In an embodiment, the predetermined rock structural features comprise one or more of dips, borehole shape, layer boundaries, porosity, vugs, texture, stylolites, natural fractures, induced fractures and/or breakouts.

In an embodiment, the extracted characterization data is selected based on an input obtained from the surface, and/or available bandwidth for transmission at the surface.

In an embodiment, extracting characterization data includes obtaining first characterization data from the detection operation, and deriving second characterization data from the first characterization data based on the available bandwidth, wherein the second characterization data is transmitted at the surface. In particular, the second characterization data may be selected from a plurality of possible second characterization data types based on the available bandwidth. Alternatively or additionally, a set of rock structural features are detected downhole and characterization data relative to a subset of the set of rock structural features is transmitted at the surface.

The characterization data may includes one or more of:
Data relative to the presence of the rock structural feature in the dataset, and/or Data relative to position of a center point of the rock structural feature, and/or Data relative to dimensions of the rock structural features along one or more predetermined axis, and/or Data relative to dimension of the rock structural feature along one predetermined axis and orientation of the predetermined axis, and/or Data relative to position of a contour of a rock structural feature, and/or Data relative to position of all of the points classified as belonging to the rock structural features.

The detection of rock structural features may include inputting the second dataset into a trained machine learning model, wherein the machine learning model has been trained based on a training dataset representative of previously identified predetermined features.

The method may also include taking decision relative to a drilling process based on the combined image. The method may also include triggering an alarm when a predetermined rock structural feature is transmitted at the surface.

In another embodiment, the disclosure relates to a method for processing measurements acquired downhole in a borehole crossing a geological formation. The method includes using a set of downhole sensors to measure one or more parameters of the borehole at a plurality of depths and azimuths. The method also includes detecting predetermined features of the borehole, using a downhole processor. Detecting the predetermined feature includes inputting a dataset representative of the one or more parameters into at least a trained machine learning model. The machine learning model has been trained based on a training dataset representative of previously identified predetermined features. The method then includes extracting data characterizing the shape and position of the predetermined features based on an output of the trained machine learning model. The data characterizing the shape and position of the predetermined feature are then transmitted at surface.

In an embodiment, the one or more datasets comprise one or more images, such as turn-indexed images. In such an embodiment, the trained machine learning model may classify each pixel of the image into a category, wherein at least one of the categories is representative of a predetermined rock structural feature.

The detection may include checking the quality of the classification obtained by the trained machine learning model. The method may also include validating the classification of the machine learning model based on the quality check. For instance, the first trained machine learning model classifies each pixel of the image into a category, wherein at least one of the category is representative of a rock structural feature, and validating the classification includes confirming or changing the category of at least one of the pixels.

In a particular embodiment, checking the quality includes computing one or more qualifiers representative of a significant portion of the one or more images. In this case, the trained machine learning model may be a first machine learning model, and checking the quality of the classification may include inputting the one or more qualifiers into a second trained machine learning model.

In an embodiment, the predetermined rock structural features comprise one or more of dips, borehole shape, layer boundaries, porosity, vugs, texture, stylolites, natural fractures, induced fractures and/or breakouts.

In an embodiment, the extracted characterization data is selected based on an input obtained from the surface, and/or available bandwidth for transmission at the surface.

In an embodiment, extracting characterization data includes obtaining first characterization data from the detection operation, and deriving second characterization data from the first characterization data, for instance based on the available bandwidth, wherein the second characterization data is transmitted at the surface. In particular, the second characterization data may be selected from a plurality of possible second characterization data types based on the available bandwidth. Alternatively or additionally, a set of rock structural features are detected downhole and characterization data relative to a subset of the set of rock structural features is transmitted at the surface.

The characterization data may includes one or more of:

Data relative to the presence of the rock structural feature in the dataset, and/or Data relative to position of a center point of the rock structural feature, and/or Data relative to dimensions of the rock structural features along one or more predetermined axis, and/or Data relative to dimension of the rock structural feature along one predetermined axis and orientation of the predetermined axis, and/or Data relative to position of a contour of a rock structural feature, and/or Data relative to position of all of the points classified as belonging to the rock structural features.

The method may also include taking decision relative to a drilling process based on the combined image. The method may also include triggering an alarm when a predetermined rock structural feature is transmitted at the surface.

In an embodiment, using the set of downhole sensors includes firing an ultrasonic sensor toward a borehole wall and receiving an echo, wherein the measured parameter is a travel time between the firing and echo signals, and/or an amplitude of the echo signal.

In an embodiment, the machine learning model includes a trained convolutional neural network.

In another embodiment, the disclosure relates to a system for providing an image based on data relative to a borehole crossing a geological formation. The system comprises a downhole tool comprising at least a first and second imaging sensor sets for acquiring respectively a first and second dataset and a control system including a telemetry system for transmitting data from the downhole tool to the surface, a downhole processing unit, situated downhole or configured to be lowered in the borehole with the downhole tool, and a surface processing unit situated at the surface. The downhole processing unit is configured to process downhole the second dataset, which includes detecting rock structural features of the borehole and extracting characterization data characterizing the shape and position of the features. The telemetry system is configured for transmitting the first dataset and characterization data at the surface, and the surface processing unit is configured to reconstructing a first image of the borehole using the first dataset and, based on characterization data, the predetermined rock structural features are overlaid on the first image to form a combined image.

The disclosure also relates to a system for processing measurements acquired downhole in a borehole crossing a geological formation. The system includes a downhole tool comprising at least a sensor set for measuring one or more parameters relative to the borehole at a plurality of depths and azimuths. It also comprises a downhole processing unit, situated downhole or configured to be lowered in the borehole with the downhole tool, that detects of the borehole using a trained machine learning model. In particular, the downhole processing unit inputs datasets representative of the parameter into the trained machine learning model. The machine learning model has been trained based on a training dataset representative of previously identified predetermined features. The downhole processing unit also extracts data characterizing the shape and position of the predetermined features based one an output of the machine learning model. The system also includes a telemetry system configured for transmitting the characterization data at surface.

The disclosure also relates to a computer-readable tangible comprising instructions to receive from a downhole tool comprising at least a sensor data representative measuring a parameter of the borehole at a plurality of depths and azimuths and to detect features of the borehole using a trained machine learning model. In particular, the downhole processing unit inputs datasets representative of the parameter into the trained machine learning model. The machine learning model has been trained based on a training dataset representative of previously identified predetermined features. The computer-readable tangible medium also comprises instructions to extracts data characterizing the shape and position of the predetermined features from the machine learning model. The computer-readable tangible medium also comprises instructions to transmit the data characterizing the shape and position of the predetermined feature at surface.

The invention claimed is:

1. A method for providing an image relative to a borehole crossing a geological formation based on data acquired downhole by a downhole tool comprising at least first and second imaging sensor sets, the method including:
    transmitting a first dataset acquired by the first imaging sensor set to surface at a well site including the borehole,
    reconstructing a first image using the first dataset,
    processing downhole a second dataset acquired by the second imaging sensor set, wherein the downhole processing includes detecting predetermined rock structural features of the borehole and extracting characterization data characterizing the shape and position of at least one of the predetermined features, wherein the extracted characterization data is selected based on available bandwidth for transmission to the surface,
    transmitting to the surface the characterization data, and
    based on the characterization data, displaying a combined image comprising the predetermined rock structural features overlaid on the first image.

2. The method of claim 1, wherein the first imaging sensor set is a resistivity sensor set and the second imaging sensor set is an ultrasonic sensor set.

3. The method of claim 1, wherein each dataset comprises data relative to one or more measured parameters as well as data relative to a position.

4. The method of claim 3, wherein the second sensor set is an ultrasonic sensor, wherein the one or more measured parameters comprises at least one of a travel time and an amplitude.

5. The method of claim 1, wherein the predetermined rock structural features comprise one or more of dips, borehole shape, layer boundaries, porosity, vugs, texture, stylolites, natural fractures, induced fractures and/or breakouts.

6. The method of claim 1, wherein the extracted characterization data is selected based on an input obtained from the surface.

7. The method of claim 1, wherein extracting characterization data includes obtaining first characterization data from the detected predetermined rock structural features of the borehole, and extracting second characterization data from the first characterization data, wherein the second characterization data is transmitted to the surface.

8. The method of claim 1, wherein the characterization data includes one or more of:
    data relative to the presence of the rock structural feature,
    data relative to position of a center point of the rock structural feature,
    data relative to dimensions of the rock structural features along one or more predetermined axis, and/or
    data relative to dimension of the rock structural feature along one predetermined axis and orientation of the predetermined axis,
    data relative to position of a contour of a rock structural feature, and/or
    data relative to position of all of the points classified as belonging to the rock structural features.

9. The method of claim 1, wherein the detection of rock structural features includes inputting the second dataset into a trained machine learning model, wherein the machine learning model has been trained based on a training dataset representative of previously identified predetermined features.

10. The method of claim 1, including making a decision relative to a drilling process based on the first image displaying the predetermined rock structural features.

11. A system for providing an image relative to a borehole crossing a geological formation, comprising
    a downhole tool comprising at least a first and second imaging sensor sets for acquiring respectively a first and second dataset, and
    a control system comprising a telemetry system for transmitting data from the downhole tool to surface at a well site including the borehole, a downhole processing unit and a surface processing unit situated at the surface, wherein:
        the downhole processing unit is configured to process downhole the second dataset, wherein the downhole processing includes detecting predetermined rock structural features of the borehole and extracting characterization data characterizing the shape and position of at least one of the predetermined features, wherein the extracted characterization data is selected based on available bandwidth for transmission to the surface,
        the telemetry system is configured for transmitting the first dataset and characterization data to the surface, and
        the surface processing unit is configured to reconstruct a first image of the borehole using the first dataset and, based on characterization data, displaying a combined image comprising the predetermined rock structural features overlaid on the first image.

* * * * *